United States Patent
Duran

[11] Patent Number: 5,967,723
[45] Date of Patent: Oct. 19, 1999

[54] NUT AND BOLT LOCKING SYSTEM

[75] Inventor: John A. Duran, Glendora, Calif.

[73] Assignee: Avibank Mfg., Inc., Burbank, Calif.

[21] Appl. No.: 09/108,437

[22] Filed: Jul. 1, 1998

[51] Int. Cl.⁶ .................................................. F16B 39/10
[52] U.S. Cl. ........................... 411/121; 411/131; 411/198
[58] Field of Search ..................................... 411/120, 121, 411/125, 126, 127, 131, 198, 199

[56] References Cited

U.S. PATENT DOCUMENTS

| | | | |
|---|---|---|---|
| 1,316,344 | 9/1919 | Wooden | 411/198 |
| 1,349,404 | 8/1920 | Blake | 411/126 |
| 2,013,526 | 9/1935 | Schmitt | 411/198 |
| 2,443,614 | 6/1948 | Gray | 411/280 |
| 4,236,561 | 12/1980 | Monticelli . | |
| 4,893,977 | 1/1990 | Tramezzani | 411/278 |
| 5,033,924 | 7/1991 | Cosenza | 411/282 |
| 5,160,227 | 11/1992 | Tramezzani | 411/278 |
| 5,362,111 | 11/1994 | Harbin | 411/121 X |

FOREIGN PATENT DOCUMENTS 547087  9/1922  France ................................. 411/126

*Primary Examiner*—Neill Wilson
*Attorney, Agent, or Firm*—Oppenheimer Wolff & Donnelly LLP

[57] ABSTRACT

A nut and bolt locking system including a bolt having an anti-lock threaded shaft receiving a lock washer thereon with a plurality of spaced ears and mating anti-lock configuration. A nut threads onto the bolt shaft after placement of the washer thereof. The nut has flats on its front face that mate with the ears on the lock washer. As the nut is torqued onto the bolt during assembly, the ears of the lock washer deform back into the flats of the nut locking the washer to the nut.

16 Claims, 6 Drawing Sheets

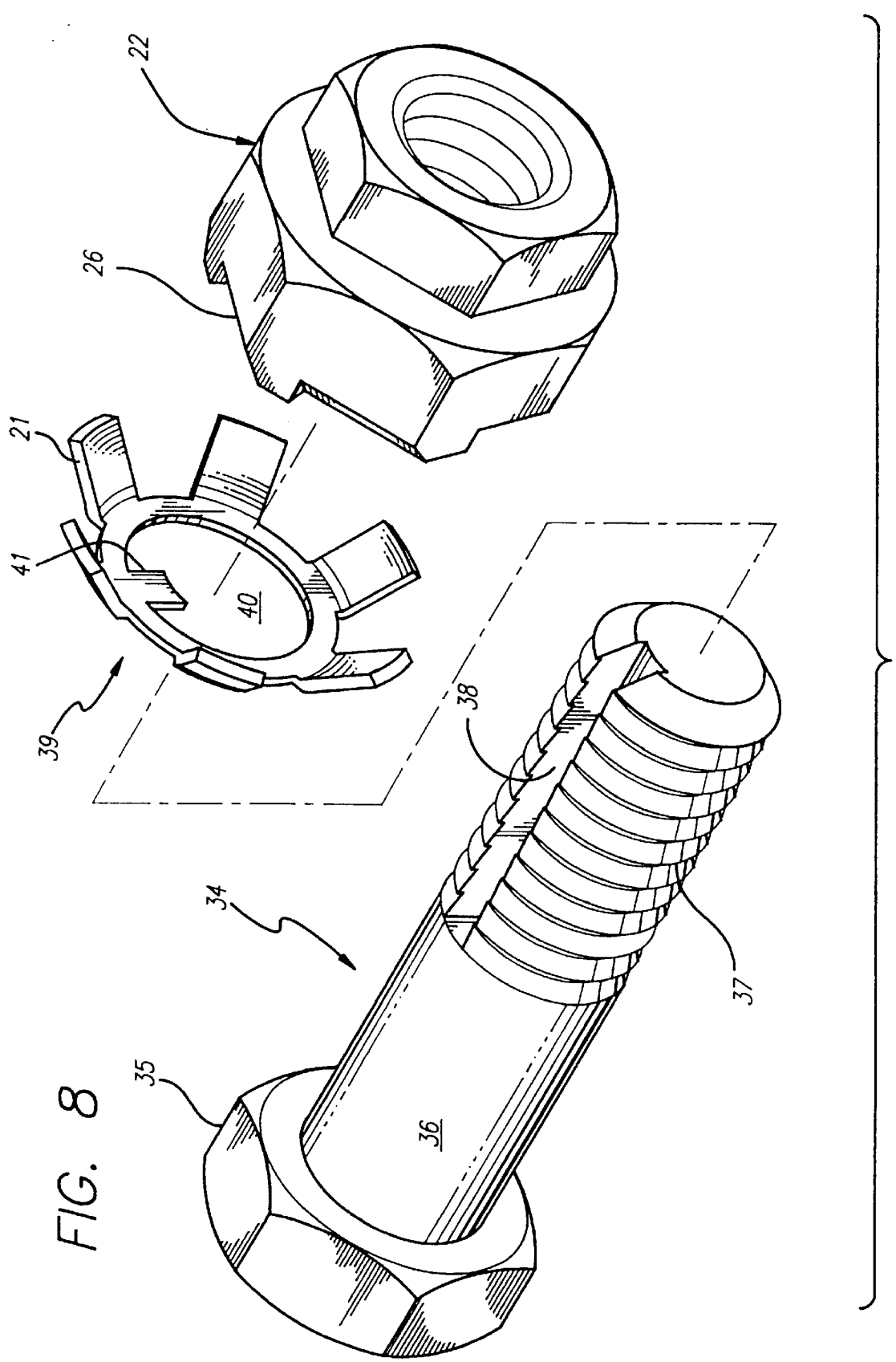

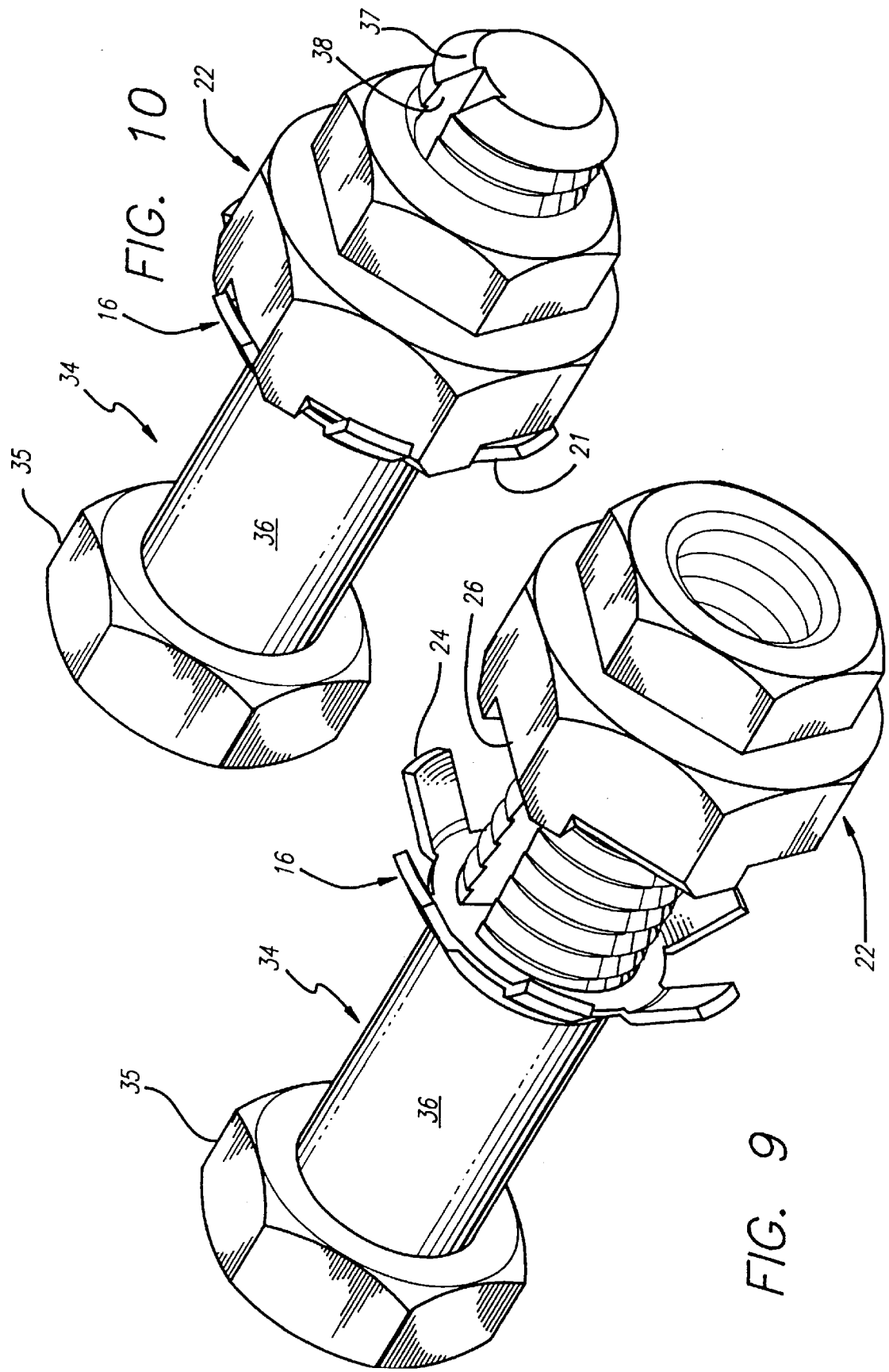

NUT AND BOLT LOCKING SYSTEM

BACKGROUND OF THE INVENTION

1. Field of the Invention

The invention relates to nut and bolt systems, and, more particularly, to a nut, washer and bolt combination that positively locks the nut to the washer.

2. Related Art

In many industries, such as the aircraft industry, there is a great need for a nut and bolt system that is capable of withstanding the severe vibrations encountered during operation of the aircraft. Similar problems exist in other industries, such as in the lawn mower or farm equipment industry.

There is a need to insure the integrity of an assembled joint, such as a flight control system in a helicopter or the like, where extreme vibration is a problem. Such a system should prevent the nut from backing off from the bolt and help prevent premature wear and/or failure due to excessive movement in the application. Other applications in which extreme vibration is a problem are vehicle steering mechanisms. In some applications, such as farm equipment, extreme vibration might result in the entire apparatus coupled to the equipment by nuts and bolts coming loose. There is thus a need for a positive bolt and nut locking system for aircraft and other commercial applications where extreme vibration takes place to prevent the nut from backing off or coming loose during such vibration. Such a system should be easily installed and, if necessary, removed using standard readily available tooling. Finally, the washer should be resilient so it can be used several times.

SUMMARY OF THE INVENTION

It is an object of this invention to provide a nut and bolt locking system where a positive lock of the nut to the bolt is effected.

It is a further object of this invention to provide a nut locked to a bolt so that it will not back off or become loose under extreme vibration.

It is another object of this invention to provide a nut and bolt locking system having a unique resilient washer which can be used several times.

It is still a further object of this invention to carry out the foregoing objects where a unique washer is first placed on the bolt, the washer and bolt being engaged in an anti-rotation relationship, the washer being engageable with the nut such that the nut locks the washer in place when torqued against the washer, then unlocks the same when backed off from engagement with the washer.

These and other objects are preferably accomplished by providing a nut and bolt locking system including a bolt having an anti-lock threaded shaft receiving a lock washer thereon with a plurality of spaced ears and mating anti-lock configuration. A nut threads onto the bolt shaft after placement of the washer thereof. The nut has flats on its front face that mate with the ears on the lock washer. As the nut is torqued onto the bolt during assembly, the ears of the lock washer deform back into the flats of the nut locking the washer to the nut. The engagement of the anti-lock configuration of the washer with the anti-lock threaded shaft of the bolt prevents rotation of the washer with respect to the bolt. Conventional tools are used to disengage the nut from the washer and unthreads it off of the bolt.

BRIEF DESCRIPTION OF THE DRAWING

FIG. 8 is an exploded view of another modification of the bolt and washer of FIGS. 1 to 5;

FIG. 9 is a partly assembled perspective view of the nut, washer and bolt of the embodiment of FIG. 8;

FIG. 10 is a final assembled perspective view of the nut, body and washer of the embodiment of FIG. 8.

DESCRIPTION OF THE PREFERRED EMBODIMENTS

Figure 1:
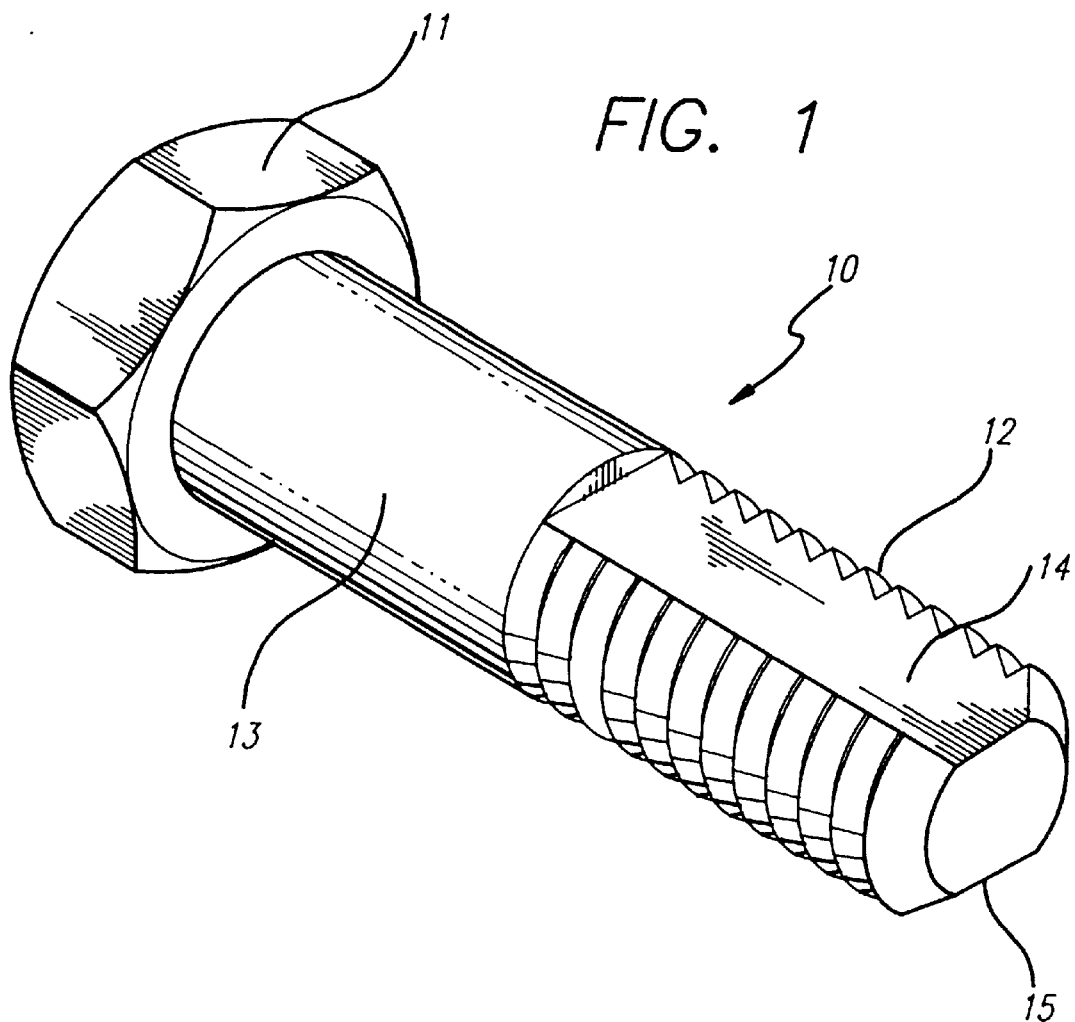
FIG. 1 is a perspective view of a bolt in accordance with the teachings of the invention.

Referring now to FIG. 1 of the drawings, a bolt 10 is shown having an enlarged hex head 11 at one end and a threaded shaft 12 as the other end. A cylindrical portion 13 interconnects head 11 to shaft 12. Bolt 10 may be any standard bolt, having any suitable type of head, such as the hex head configuration shown in FIG. 1, a countersunk head tapered on its undersurface as is well known in the art, etc. Shaft 12 is of course a standard type thread. However, as particularly contemplated in the present invention, an anti-rotation feature is incorporated in shaft 12. Thus, as shown, elongated flats 14, 15 are provided on opposite sides of shaft 12.

Figure 2:
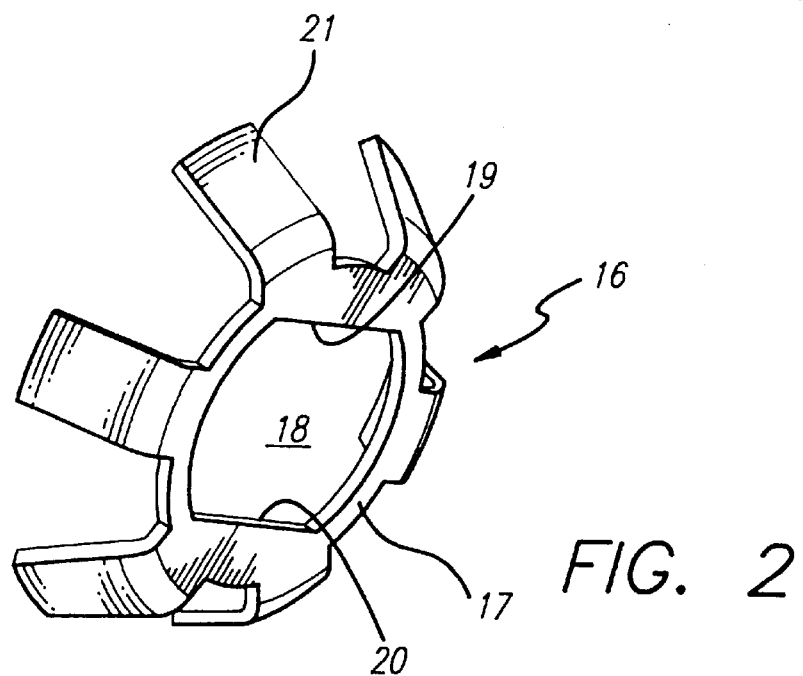
FIG. 2 is a perspective view of a washer in accordance with the teachings of the invention.
Figure 3:
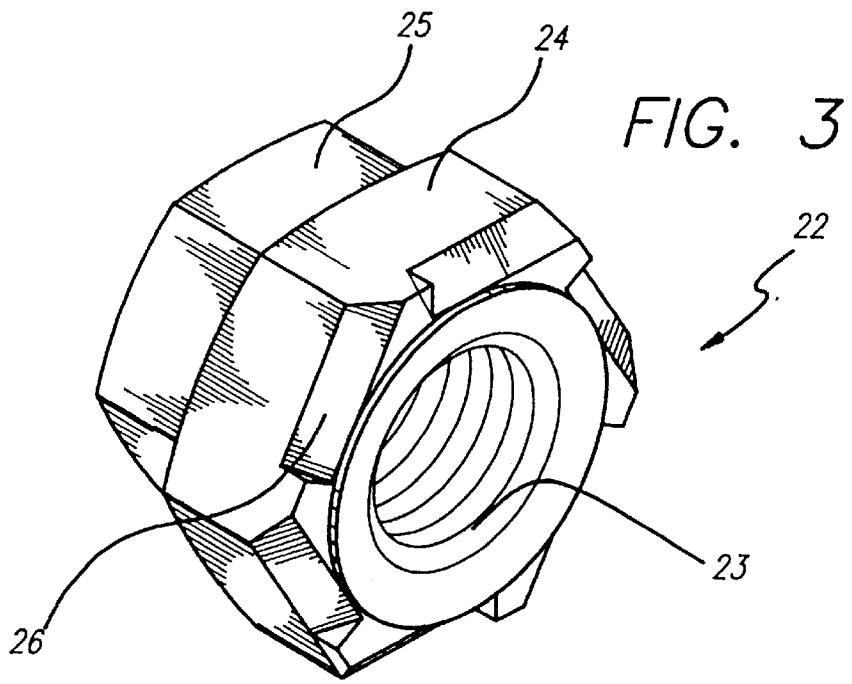
FIG. 3 is a perspective view of a nut in accordance with the teachings of the invention.

As seen in FIG. 2, a washer 16 is provided adapted to mate with bolt 10. Washer 16 thus has a generally circular main body portion 17 with a central aperture 18. Again, as particularly contemplated in the present invention, a pair of straight sides 19, 20 are provided adapted to mate with the flats 14, 15 of bolt 10. Further, a plurality of spaced ears 21 are provided about the outer periphery of main body portion 17 extending away therefrom and slightly angled outwardly as shown. Washer 16 is preferably made of spring steel or the like so that ears 21 are resilient and the washer 16 can be used several times. Bolt 10 may be made of any suitable material, such as high heat alloy steel. Bolt 10 may also be made of a high strength plastic for use in certain applications. P A suitable nut 22 for use with the bolt and washer of FIGS. 1 and 2 is shown in FIG. 3. Nut 22 has a threaded throughbore 23 adapted to mate with threaded shaft 12. Nut 22 also has a main hex body portion 24 with an integral stepped hex body portion 25 lesser in outer diameter than body portion 24. A plurality of spaced flats 26 are provided about the front face of main body portion 24. These flats 26 are generally related to the width and spacing of ears 21 of washer 16 as will be discussed.

Figure 4:
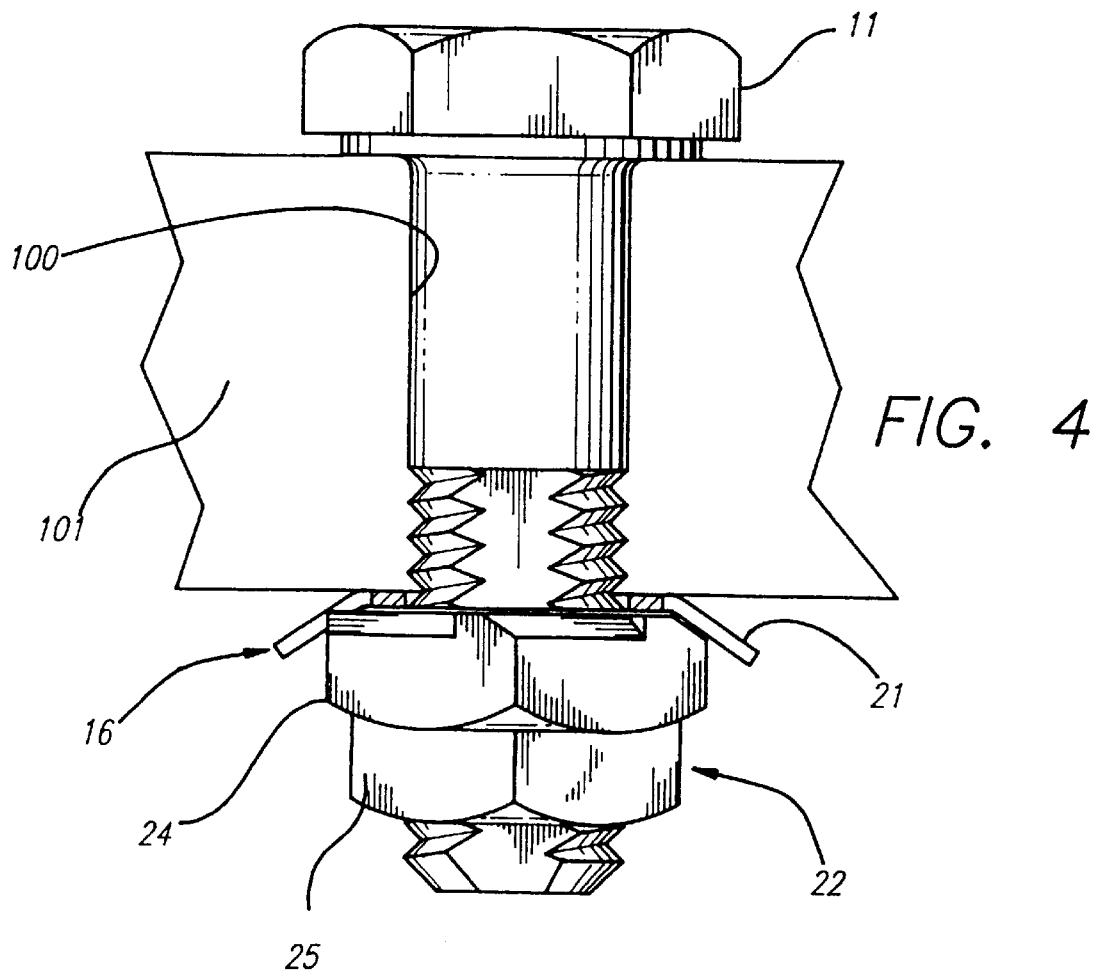
FIG. 4 is a vertical assembled view of the parts of FIGS. 1 to 3 to a preexisting installation.

In assembling the parts of FIGS. 1 to 3, as seen in FIG. 4, bolt 10 is installed in a suitable hole 100 in installation 101. Washer 16 is placed on shaft 12 of bolt 10, the ears 21 extending away from bolt 10 and the flats 14, 15 of shaft 12 mating with the sides 19, 20 of washer 16. Nut 22 is now threaded onto shaft 12.

As nut 22 is torqued onto shaft 12 against the resilient bias of the ears 21 of washer 16, the ears 21 deform and shape into the flats 26 of nut 22. This is the position shown in FIG. 4. Washer 16 is prevented from rotating on shaft 12 due to the anti-rotation feature provided by flats 14, 15 and sides 19, 20. Washer 16 is locked to nut 22 by the engagement of ears 21 in flats 26.

The large and small hex heads 24, 25, respectively, of nut 22 allow the installer to install the nut 22 by a suitable tool (not shown in FIG. 4) used on the smaller hex head 25. Once nut 22 is properly installed, the installer can visually see that washer 16 is locked in properly and nut 22 cannot back off.

Figure 5:
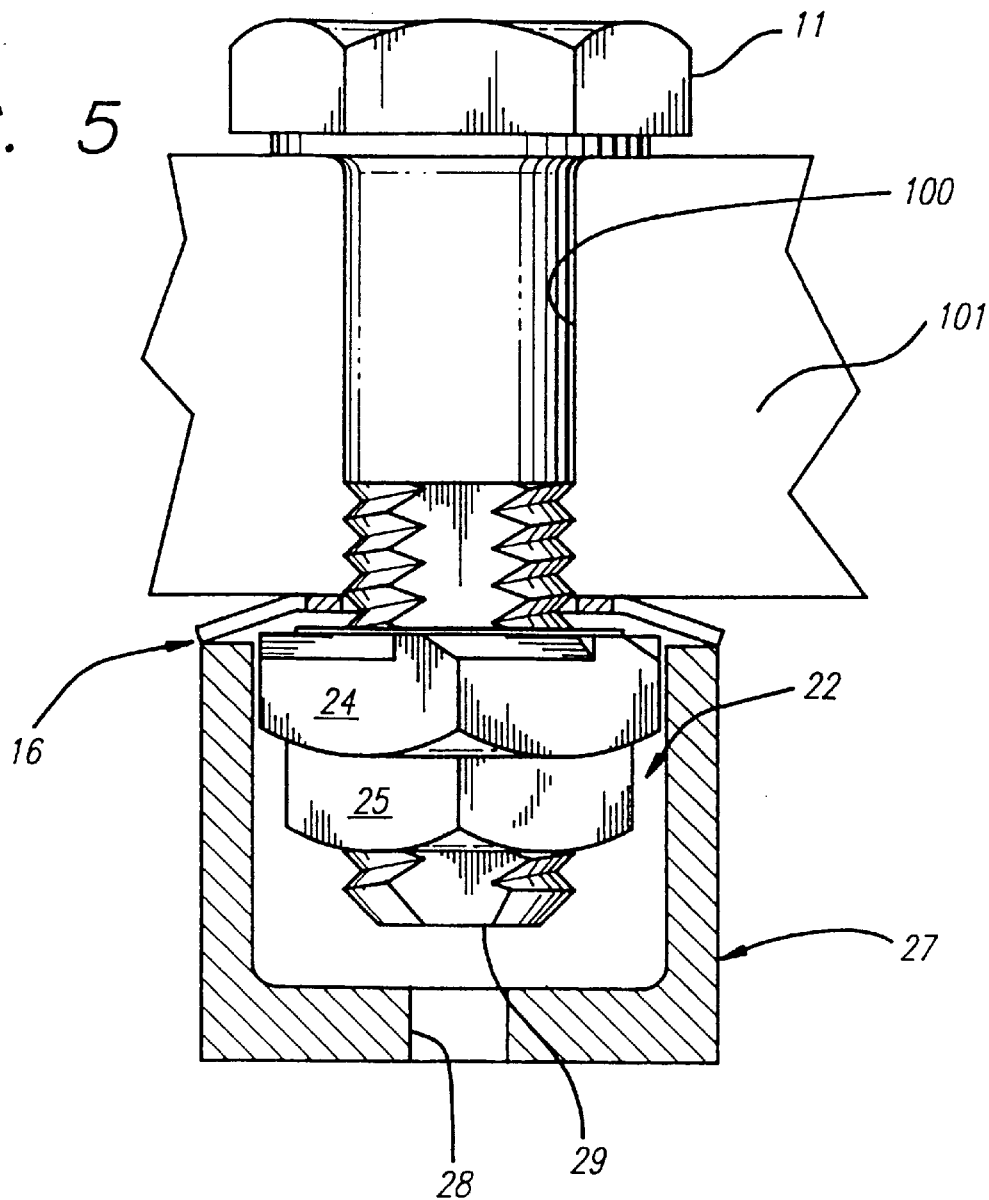
FIG. 5 is an elevational view, partly in section, illustrating the assembly of the parts of FIGS. 1 to 4 to a suitable installation with a conventional tool mounted to the nut.

In order to remove nut 22 from bolt 10, it is necessary to disengage washer 16 from nut 22. This is shown in FIG. 5 wherein a conventional readily available socket wrench having a socket head 27 (the remaining portion of the wrench not shown for convenience of illustration) is installed onto the larger hex head 24 and pushes against the ears 21 of washer 16 which moves the ears 21 out of flats 26. As the socket head is rotated, nut 22 is rotated counterclockwise to back nut 22 off of shaft 14 and washer 16 can then be removed.

Figure 6:
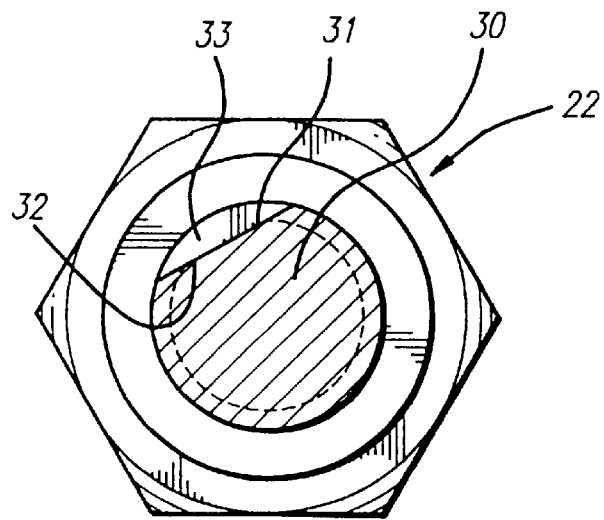
FIG. 6 is an end sectional view of a modified bolt and washer in accordance with the teachings of the invention.
Figure 7:
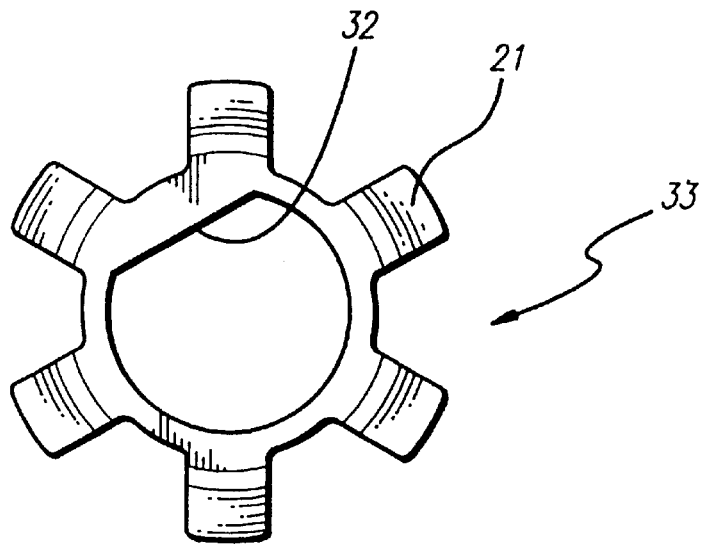
FIG. 7 is a plan view of the modified washer of FIG. 6.

Although a pair of flats are shown on bolt 10 of FIG. 1, and two mating sides are shown in washer 16 of FIG. 2, only one mating straight edge need be provided on the washer. This is shown in FIG. 6 wherein like numerals refer to like parts of the embodiment of FIGS. 1 to 5. Here shaft 30 has only one flat 31 mating with only one straight edge 32 of washer (see also FIG. 7). The operation as heretofore discussed is similar and further discussion is deemed unnecessary.

Although flats are disclosed for the anti-rotation feature between the bolt and the washer, obviously other anti-rotation means may be used. This is shown in FIG. 8 where again like numerals refer to like parts of the embodiment of FIGS. 1 to 5. Thus, bolt 34 has a hex head 35, and intermediate cylindrical portion 36, and an integral threaded shaft 37. However, in this embodiment, bolt 34 has an elongated slot 38 extending along shaft 37. Washer 39 has a central generally circular opening 40 therethrough with a single tang 41 receivable in slot 38 of bolt 34. The initial assembly of parts is shown in FIG. 9. The final assembly is shown in FIG. 10. The installation and uninstallation of nut 22 onto bolt 34 and against washer 16 installed thereon is identical to the installation and uninstallation of the bolt, washer and nut system of FIGS. 1 to 5 and further discussion is deemed unnecessary.

Figure 11:
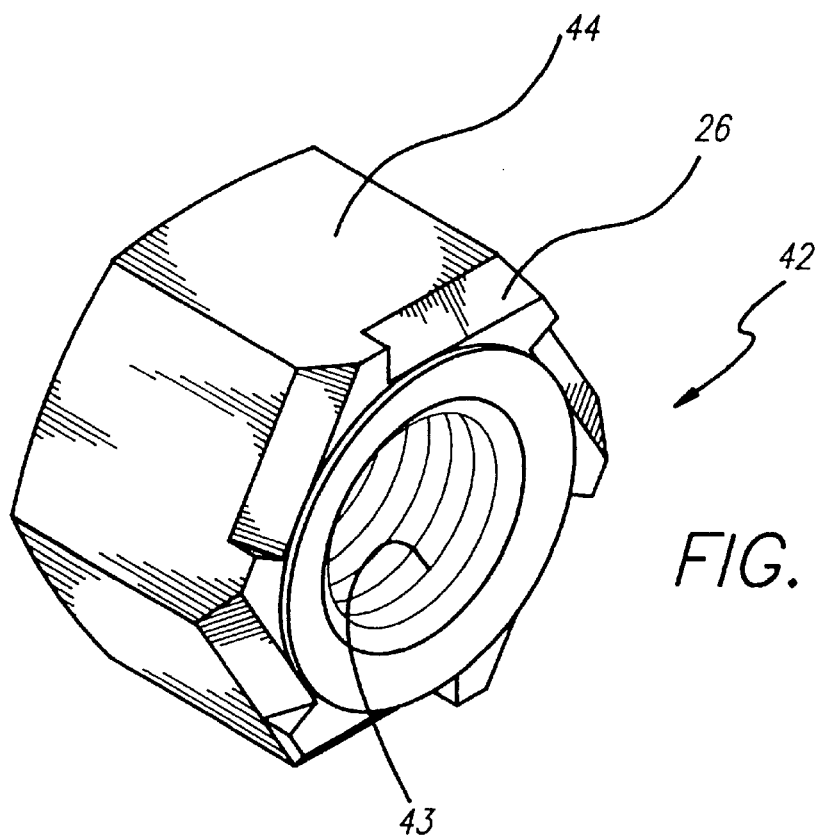
FIG. 11 is a perspective view of a modification of the nut of FIG. 3.

Although a particular type of nut is discussed in the embodiment of FIGS. 1 to 10, any suitable nut may be used. Thus, nut 42 of FIG. 11 having a threaded throughbore 43 and a main hex body 44 may be used. Nut 42 thus does not have a lesser diameter hex portion but does have spaced flats 26 identical to flats 26 of nut 22 of FIGS. 1 to 5. In this embodiment, nut 42 can be installed in like manner to nut 22. When a socket wrench having head 27 as in FIG. 5 is used to install or uninstall the nut 42, nut 42 bears against ears 21 as heretofore discussed disengaging them from flats 26.

The washer is resilient to allow it to be used several times. It is not intended for one time use, such as prior art washers with tangs that are not resilient and mechanically deformed in use. Such washers are intended for one time use only.

Although a particular embodiment of the invention is disclosed, variations thereof may occur to an artisan and the scope of the invention should only be considered limited by the scope of the appended claims.

I claim:

1. A nut and bolt locking system comprising:

a bolt having an enlarged head at one end and an integral elongated threaded shaft at the other end;

a washer having a flat general round apertured main body portion having an outer periphery with a generally central opening therethrough, said threaded shaft receivable in said opening, said flat main body portion having a plurality of spaced ears extending about the outer periphery thereon and in a direction away from said shaft, said washer being keyed to said shaft for non-rotation with respect to said shaft;

and a nut having flat generally round apertured main body portion having an outer periphery with a threaded throughbore, said threaded throughbore mating with the threaded of said threaded bolt shaft, said nut having a plurality of spaced flats extending from the outer periphery of said main body portion of said nut receiving said ears of said washer therein with the flat main body portion of said washer abutting directly against the flat main body portion of said nut with respective one of said spaced ears disposed in respective ones of said spaced flats when said nut is rotated on said shaft against said washer.

2. The system of claim 1 wherein said main body portion of said nut is hex-shaped about the exterior thereof.

3. The system of claim 1 wherein said washer is keyed to said shaft for non-rotation thereof by at least one flat extending along said shaft engaging at least one like configured straight edge in said opening through said washer.

4. The system of claim 3 wherein a pair or spaced flats and a pair of spaced straight edges are provided.

5. The system of claim 1 wherein said washer is keyed to said shaft for non-rotation thereof by at least one elongated slot extending along said shaft receiving therein at least one tang extending from the main body portion of said washer into the opening therethrough.

6. The system of claim 1 wherein said main body portion of said nut includes a first hex-shaped portion having said flats thereon and an integral second hex-shaped portion extending away form said flats of lesser outer diameter than said hex-shaped portion.

7. The system of claim 1 wherein said washer is of resilient material so that it can be re-used.

8. A combination nut and bolt locking system mounted in a hole in an installation comprising:

a bolt having an enlarged head at one end abutting against said installation and an integral elongated threaded shaft at the other end extending through said hole in said installation;

a washer having a flat generally round apertured main body portion having an outer periphery with a generally central opening therethrough, said threaded shaft receivable in said opening, said flat main body portion being disposed against said installation on the side thereof opposite said head having a plurality of spaced ears extending about the outer periphery thereon and in a direction away from said shaft, said washer being keyed to said shaft for non-rotation with respect to said shaft;

and a nut having a flat generally round apertured main body portion having an outer periphery with a threaded throughbore, said threaded throughbore mating with the threaded of said threaded bolt shaft, said nut having a plurality of spaced flats extending from the outer periphery of said main body portion of said nut receiving said ears of said washer therein with the flat main body portion of said washer abutting directly against the flat main body portion of said nut with respective ones of said spaced ears disposed in respective ones of said spaced flats when said nut is rotated on said shaft against said washer and said installation.

9. The combination of claim 8 wherein said main body portion of said nut is hex-shaped about the exterior thereof.

10. The combination of claim 8 wherein said washer is keyed to said shaft for non-rotation thereof by at least one flat extending along said shaft engaging at least one like configured straight edge in said opening through said washer.

11. The combination of claim 10 wherein a pair of spaced flats and a pair of spaced straight edges are provided.

12. The combination of claim 8 wherein said washer is keyed to said shaft for non-rotation thereof by at least one elongated slot extending along said shaft receiving therein at least one tang extending from the main body portion of said washer into the opening therethrough.

13. The combination of claim 8 wherein said main body portion of said nut includes a first hex-shaped portion having said flats thereon and an integral second hex-shaped portion extending away from said flats of lesser outer diameter than said first hex-shaped portion.

14. The combination of claim 8 wherein said washer is of resilient material so that it can be re-used.

15. A nut and bolt locking system comprising:

a bolt having an enlarged head at one end and an integral elongated threaded shaft at the other end;

a washer having a main body portion with a generally central opening therethrough, said threaded shaft receivable in said opening, said main body portion having a plurality of spaced ears extending about the outer periphery thereon and in a direction away from said shaft, said washer being keyed to said shaft for non-rotation with respect to said shaft;

and a nut having a main body portion with a threaded throughbore, said threaded throughbore mating with the treaded of said threaded bolt shaft, said nut having a plurality of spaced flats about the outer periphery of said main body portion receiving said ears of said washer therein when said nut is rotated on said shaft against said washer, said main body portion of said nut including a first hex-shaped portion having said flats thereon and an integral second hex-shaped portion extending away from said flats of lesser outer diameter than said hex-shaped portion.

16. A combination nut and bolt locking system mounted in a hole in an installation comprising:

a bolt having an enlarged head at one end abutting against said installation and an integral elongated threaded shaft at the other end extending through said hole in said installation;

a washer having a main body portion with a generally central opening therethrough, said threaded shaft receivable in said opening, said main body portion being disposed against said installation on the side thereof opposite said head having a plurality of spaced ears extending about the outer periphery thereon and in a direction away from said shaft, said washer being keyed to said shaft for non-rotation with respect to said shaft;

and a nut having a main body portion with a threaded throughbore, said threaded throughbore mating with the threaded of said threaded bolt shaft, said nut having a plurality of spaced flats about the outer periphery of said main body portion receiving said ears of said washer therein when said nut is rotated on said shaft against said washer and said installation, said main body portion of said nut including a first hex-shaped portion having said flats thereon and an integral second hex-shaped portion extending away from said flats of lesser outer diameter than said first hex-shaped portion.

* * * * *